UNITED STATES PATENT OFFICE.

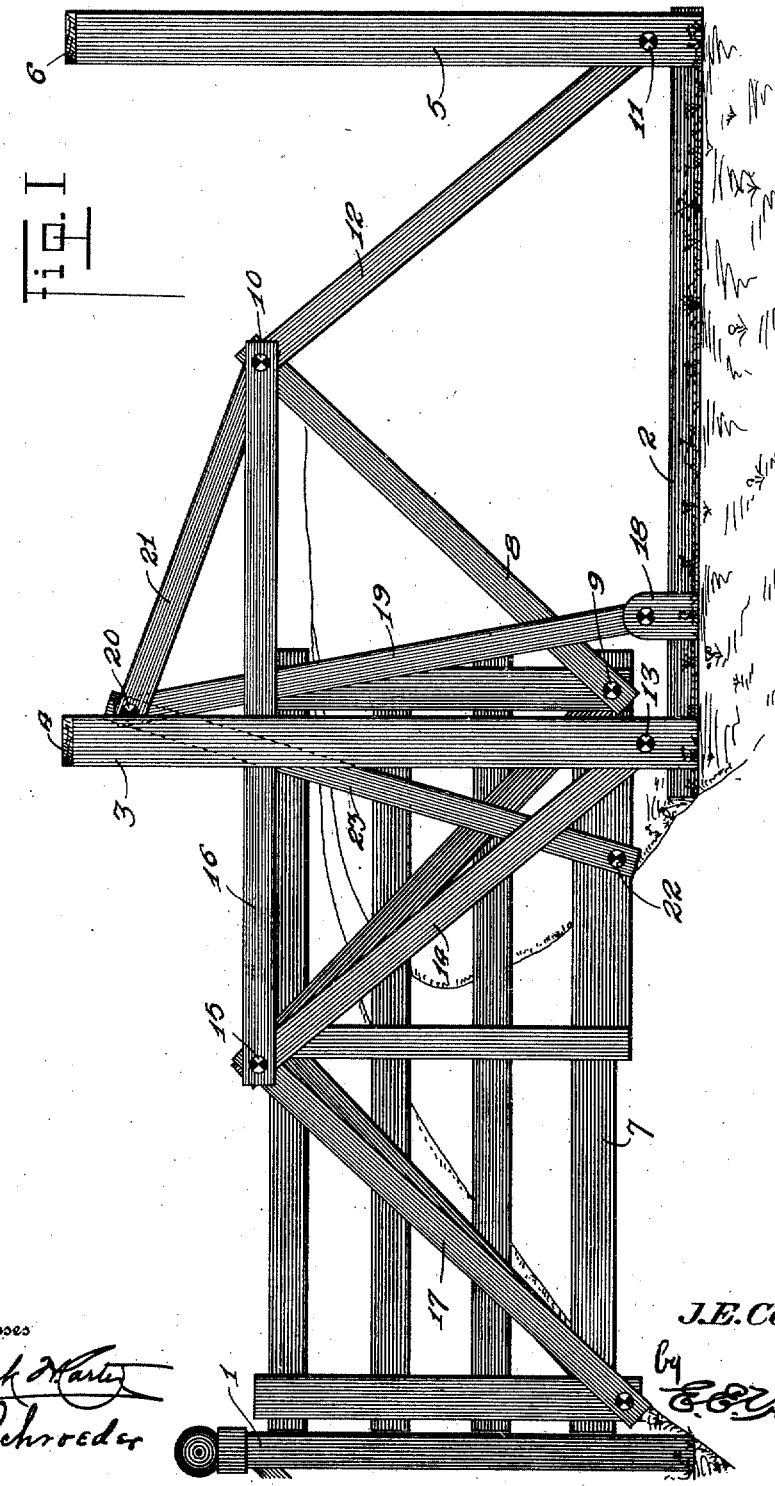

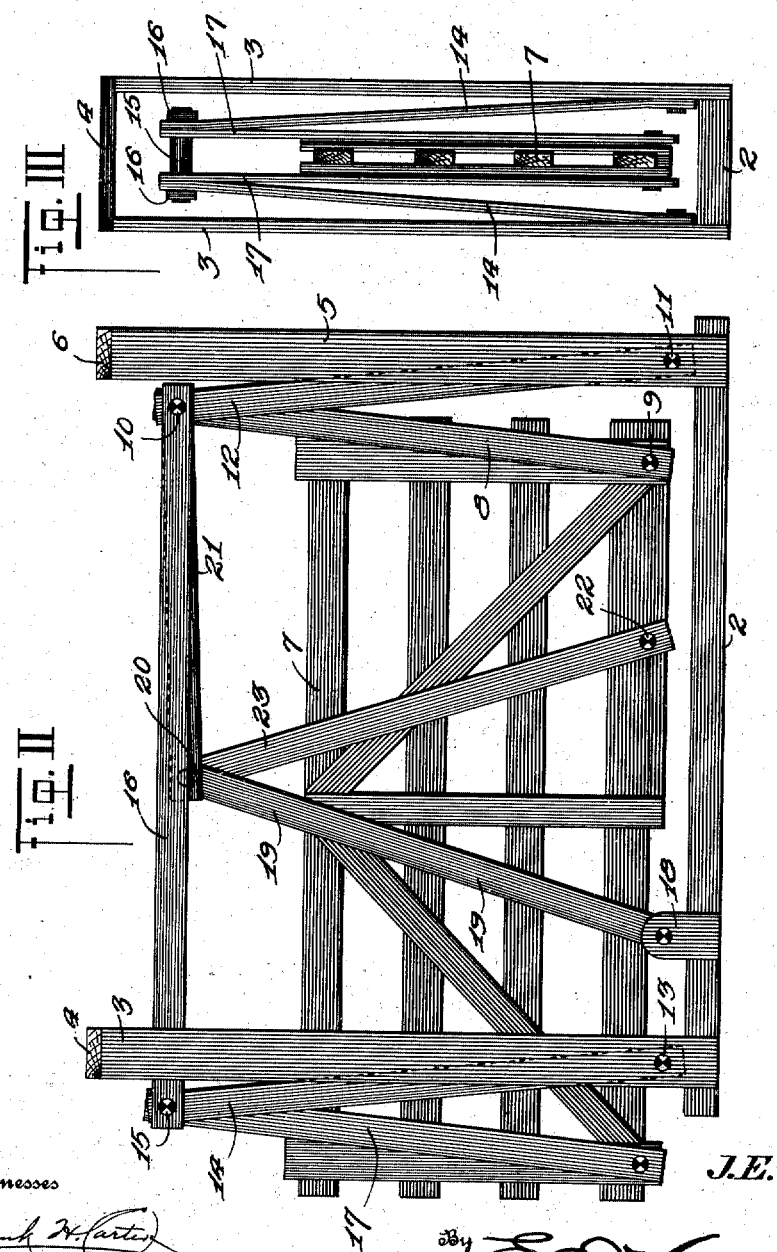

JULIAN E. CORBIN, OF OAKLAND, CALIFORNIA.

GATE.

985,325. Specification of Letters Patent. Patented Feb. 28, 1911.

Application filed March 5, 1910. Serial No. 547,570.

*To all whom it may concern:*

Be it known that I, JULIAN E. CORBIN, citizen of the United States, residing at Oakland, in the county of Alameda and State of California, have invented certain new and useful Improvements in Gates, of which the following is a specification.

This invention relates to sliding and swinging gates, and the principal object of the same is to provide a novel supporting frame in which a system of pivotally connected levers are mounted, said levers having a pivotal connection with a gate so that the gate is evenly balanced and may be readily swung to an open or closed position with the minimum of labor.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure I is a view in side elevation showing the gate swung to a closed position. Fig. II is a similar view, the gate being shown open. Fig. III is a view in end elevation showing the gate between the supporting frame.

Referring to said drawings by numerals, 1 designates a latching post that is located at one side of a roadway. On the opposite side of the roadway a supporting frame is located in which a gate and the operating levers are mounted. Said frame comprises an elongated flat base 2 which has a pair of vertically arranged parallel spaced apart standards 3 projecting therefrom at one end, said standards being connected at their upper ends by the member 4 thereby providing a guide through which the gate is swung. At its other end, said base is provided with another pair of spaced apart standards 5 which have an upper connecting member 6, which arrangement provides a guide for the rear of the gate which coöperates with the front guide to retain the gate upright when in an open position.

The gate 7 shown in the accompanying drawings is formed of spaced apart parallel horizontal bars and vertical connecting brace bars. Said gate is suspended within the supporting frame by means of a system of levers so that it may be projected therefrom to engage the latching post 1 or retract it so that it will rest between the front and rear guides. Said levers comprise a pair of parallel bars 8 which have their lower ends pivotally mounted on opposite ends of pivot shaft 9 that extend through the lower rear corner of the gate 7, the upper ends of said bars being connected by a pivot shaft 10. Inwardly projecting pivot studs 11 are carried by the lower portions of rear standards 5, said studs having parallel bars 12 pivotally mounted thereon which extend to and are pivotally mounted on shaft 10.

Front standards 3 are provided with inwardly projecting pivot studs 13 at their base portions from which the parallel bars 14 project. Said bars 14 extend on opposite sides of the gate 7 and above the same and have their ends connected by a pivot shaft 15. Parallel bars 16 extend from opposite ends of shaft 15 and are pivotally connected to opposite ends of shaft 10. A pair of parallel bars 17 have their lower ends pivotally connected to the lower forward corner of gate 7, said bars projecting on opposite sides of the gate 7 and extending above the same and pivotally connected to shaft 15.

Base 2 of the supporting frame is provided with a pair of oppositely disposed vertical pivot ears 18, said ears being located to the rear of standards 3. A bar 19 is pivotally connected to each ear 18, said bars being parallel and extending on opposite sides of and projecting well above the gate 7. The upper ends of said bars 19 are connected by a pivot shaft 20 from opposite ends of which the bars 21 extend and connect with pivot shaft 10.

At its lower portion, and adjacent the lower rear corner, gate 7 is provided with a transverse pivot shaft 22. Bars 23 project from opposite ends of shaft 22 and connect with shaft 20.

It will be seen that the system of lever bars 12, 14 and 16 provides a pivotally connecting suspending frame in which the gate suspending levers 17, 23 and 8 are pivotally mounted, the suspending frame being capable of being expanded and contracted, and the gate suspending levers being capable of being rocked within said frame, so that the gate will be evenly balanced and may be readily moved to or from the main supporting frame to open or close the gate, with the expenditure of the minimum of labor.

What I claim as my invention is:—

A swinging gate of the character described, consisting of a frame having a longitudinal base-portion, parallel upright portions at each end of said base-portion, parallel vertical ears mounted on said base adjacent to its forward end, a longitudinal swinging gate supported by said frame and connected thereto by swinging members consisting of a pair of horizontal bars normally extending longitudinally above said gate, a pair of diagonal bars pivotally connected at one end to the lower forward corner of the gate and at their other end to one end of said horizontal bars, a pair of diagonal bars pivoted at one end to the lower portion of the uprights at the forward end of the base and at their other end to said horizontal bars, a pair of diagonal bars pivoted at one end to the lower inner corner of the gate and at their other end to the opposite end of said horizontal bars, a pair of diagonal bars pivoted at one end to the lower end of the rear upright of the main frame and at their other end to the rear end of the horizontal bars, a pair of short bars pivoted at one end to the inner end of the horizontal bars, a pair of diagonal bars pivoted at one end to said ears and at the other end to said short bars, and a pair of diagonal bars pivoted at one end to the lower rail of the gate adjacent to its rear end and at the other end pivoted to said short parallel bars.

In testimony whereof I affix my signature in presence of two witnesses.

JULIAN E. CORBIN.

Witnesses:
E. G. GRAY,
H. C. SCHROEDER.

---

Copies of this patent may be obtained for five cents each, by addressing the "Commissioner of Patents, Washington, D. C."